(12) United States Patent
Li et al.

(10) Patent No.: US 7,110,350 B2
(45) Date of Patent: Sep. 19, 2006

(54) WIRELESS LAN COMPATIBLE MULTI-INPUT MULTI-OUTPUT SYSTEM

(75) Inventors: Jian Li, Gainesville, FL (US); Jianhua Liu, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 10/793,712

(22) Filed: Mar. 5, 2004

(65) Prior Publication Data

US 2004/0258025 A1 Dec. 23, 2004

Related U.S. Application Data

(60) Provisional application No. 60/452,513, filed on Jun. 18, 2003.

(51) Int. Cl.
*H04J 9/00* (2006.01)
*H04Q 7/00* (2006.01)
*H04L 1/02* (2006.01)

(52) U.S. Cl. ............ 370/204; 370/208; 370/334; 375/347; 455/103

(58) Field of Classification Search ......... 370/310, 370/334, 505, 338, 203–208; 375/299, 347, 375/349, 267; 455/132, 296, 135, 303, 101–103
See application file for complete search history.

(56) References Cited

U.S. PATENT DOCUMENTS

| 5,450,453 | A | * | 9/1995 | Frank | 375/130 |
|---|---|---|---|---|---|
| 5,809,089 | A | * | 9/1998 | Vasic | 375/341 |
| 6,078,626 | A | * | 6/2000 | Ramesh | 375/262 |
| 6,115,370 | A | * | 9/2000 | Struhsaker et al. | 370/342 |
| 6,314,147 | B1 | * | 11/2001 | Liang et al. | 375/346 |
| 6,473,467 | B1 | * | 10/2002 | Wallace et al. | 375/267 |
| 6,771,706 | B1 | * | 8/2004 | Ling et al. | 375/267 |
| 6,785,341 | B1 | * | 8/2004 | Walton et al. | 375/267 |
| 6,829,312 | B1 | * | 12/2004 | Laurila et al. | 375/340 |
| 6,850,481 | B1 | * | 2/2005 | Wu et al. | 370/208 |
| 2003/0154435 | A1 | * | 8/2003 | Claussen et al. | 714/755 |

OTHER PUBLICATIONS

Wang, X. et al, "Iterative (Turbo) Soft Interference Cancellation and Decoding for Coded CDMA",IEEE Transactions on Communications, IEEE 0090-6778/99, vol. 47, No. 7, Jul. 1999, pp. 1046-1061.*
Hassibi, B., "A Fast Square-Root Implementation for BLAST", Bell Labs, Lucent Technologies, IEEE-0-7803-6514-3, Mar. 2000, pp. 1255-1259.*
Fazel, K., "Iterative Decoding of Generalized Concatenated Convolutional Codes", DLR, Institute of Communications Technology, IEEE-0-7803-3925-8, Aug. 1997, pp. 704-709.*

* cited by examiner

*Primary Examiner*—Chi Pham
*Assistant Examiner*—Tri H. Phan
(74) *Attorney, Agent, or Firm*—Akerman Senterfitt; Greg Nelson; Richard Hinson (57) ABSTRACT

A system and method for enhancing the data rate of a WLAN. Through the deployment of a MIMO system, the data rate ordinarily expected of a SISO type system can be doubled. Yet, the MIMO system of the present invention can remain backward compatible with conventional WLAN standards implemented by typical SISO type system. In particular, the packet preamble of the MIMO packet of the present invention is similar to that of a conventional SISO system so as to be backward compatible with conventional SISO receivers. Additionally, the data model of the MIMO system can be configured to support the detection of symbols in the MIMO packet of the present invention. Importantly, the present invention can include a least squares soft-detector for use in a wireless LAN compatible MIMO system.

28 Claims, 5 Drawing Sheets

Conventional IEEE 802.11a Packet Structure

FIG. 6

MIMO Packet Structure

WIRELESS LAN COMPATIBLE MULTI-INPUT MULTI-OUTPUT SYSTEM

CROSS-REFERENCE TO RELATED APPLICATIONS

This application claims the benefit of U.S. Provisional Application No. 60/452,513, filed in the United States Patent and Trademark Office on Jun. 18, 2003, the entirety of which is incorporated herein by reference.

STATEMENT AS TO FEDERALLY SPONSORED RESEARCH

The invention was made with U.S. government support under grant number CCR-0097114 awarded by the National Science Foundation. The U.S. government may have certain rights in the invention.

STATEMENT OF THE TECHNICAL FIELD

The present invention relates to a multi-input multi-output (MIMO) system and more particularly to a MIMO system which is configured with backward compatibility with wireless LAN (WLAN) technology.

DESCRIPTION OF THE RELATED ART

Figure 5:
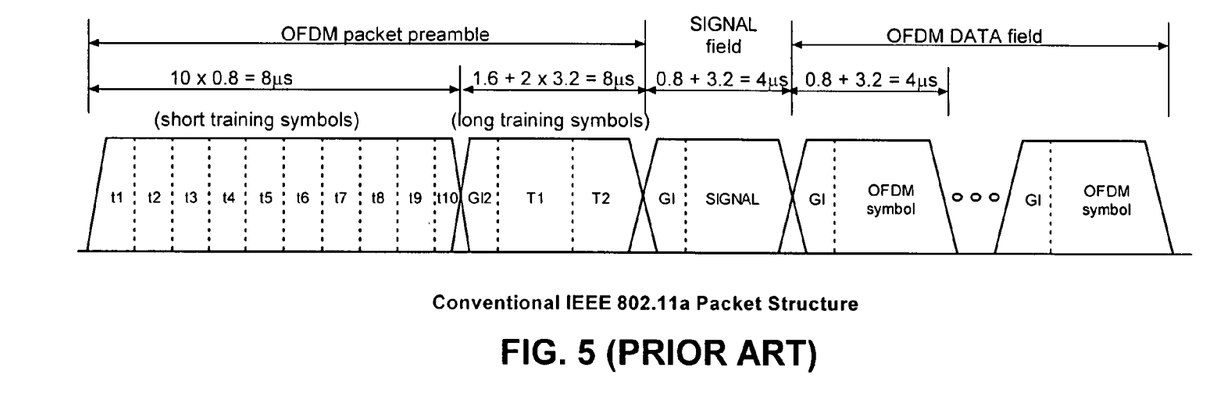
FIG. 5 is a timing diagram illustrating the conventional IEEE 802.11a packet structure known in the art; and, FIG. 6 is a timing diagram illustrating a MIMO packet structure for use in the MIMO system of the present invention.

Orthogonal frequency-division multiplexing (OFDM) serves as the basis for the Institute of Electrical and Electronic Engineers (IEEE) 802.11a high-speed WLAN standard as well as the IEEE 802.11g and HIPERLAN/2 standards. The OFDM based WLAN system, as specified by IEEE 802.11a (the IEEE 802.11g and HIPERLAN/2 standards are similar to the IEEE 802.11a standard in the sense that they have the same signal format and generation; we use IEEE 802.11a to exemplify our presentation in the sequel) utilizes packet-based data transmission techniques. In that regard, as shown in FIG. 5, each packet in the IEEE 802.11a scheme can include an OFDM packet preamble, a SIGNAL field and an OFDM DATA field. The packet preamble can be used to estimate necessary channel parameters such as carrier frequency offset (CFO), symbol timing, and channel impulse response. These channel parameters are required for data symbol detection in the OFDM DATA field.

Notably, the preamble configuration specified by the 802.11a standard has been designed specifically for a single-input single-output (SISO) system in which both the transmitter and receiver manage merely a single signal. In a SISO system configuration, then, the 802.11a standard supports a data rate of at most fifty-four (54) mega-bits per second (Mbps). Yet, transmission data rates which exceed 54 Mbps can be of particular importance with respect to future WLAN implementations.

Deploying multiple antennae at both the transmitter and receiver has been proven to be a promising way to achieve higher data transmission rates for wireless communication systems over multipath-rich wireless channels, all the while without increasing the total transmission power or bandwidth consumed by the system. In a system which incorporates multiple transmit and receive antennae, referred to in the art as a MIMO wireless communications system, a set of M transmit antennae, and a set of N receive antennae can be provided, wherein N and M are not necessarily equal. Among the various popular MIMO systems known in the art, the Bell Labs Layered Space-Time (BLAST) system is a popular implementation.

The BLAST system has been proven successful in achieving a potentially large channel capacity offered by the MIMO system. In the BLAST system, the data stream can be de-multiplexed into multiple independent sub-streams referred to as layers. Each layer can be transmitted simultaneously with other layers, for instance, using one antenna per layer. At the receiver, the multiple layers can be detected. The detection function can be provided through successive detection via an interference cancellation and nulling algorithm (ICNA), or possibly through a sphere decoding (SPD) algorithm.

Notably, in a system which conforms to the IEEE 802.11a standard, it can be preferable to incorporate within the system the use of a channel coding technique to provide the advantages of forward error correction (FEC), where channel coding is the process of adding redundant information to a digital signal conveyed through a channel. Two forms of channel coding include convolutional coding and block coding, with convolutional coding being preferred. The IEEE 802.11a standard uses FEC codes so as to dramatically lower the Bit-Error-Rate (BER). Consequently, a convolutional decoder can be deployed within the receiver of the BLAST system in satisfaction of this preference.

Importantly, it has been recognized by those skilled artisans that a convolutional decoder with soft-information can outperform its counterpart with hard-information. To that end, the Viterbi convolutional decoder, a popular convolutional decoder, requires soft-information in order to improve decoding performance. Yet, both the ICNA and SPD schemes, in addition to the numerous variations thereof, can be characterized merely as "hard" detectors. Consequently, neither the ICNA scheme, nor the SPD scheme can provide the soft information required by the Viterbi decoder.

Though attempts have been made to design soft-detectors based on the ICNA and SPD schemes, the known designs have been characterized as complicated and not suitable for wide-spread use. Similarly, while space-time bit interleaved coded modulation (STBICM) technology can deliver the soft-output required by the Viterbi decoder, this can be done only at a tremendous computational cost when using large symbol constellations, such as 64-QAM, even when the number of transmitting antennas or M is as small as 2. Finally, a list SPD (LSPD) algorithm has been proposed for reducing the computational cost of STBICM with a price of only a small performance degradation. Yet, LSPD technology is still complicated to implement, particularly in reference to real-time implementations involving large constellations.

SUMMARY OF THE INVENTION

The present invention is a system and method for enhancing the data rate of a WLAN. In particular, through the deployment of a MIMO system, the data rate ordinarily expected of a SISO type system can be doubled. Yet, the MIMO system of the present invention can remain backward compatible with conventional WLAN standards implemented by typical SISO type system. In particular, the packet preamble, referred to as a MIMO preamble, of the MIMO packet of the present invention is similar to that of a conventional SISO system so as to be backward compatible with the conventional SISO packet preamble. Additionally, the data model of the MIMO system can be configured to support the detection of symbols in the MIMO packet of the present invention.

Importantly, the present invention can include a least squares soft-detector for use in a wireless LAN compatible MIMO system. In accordance with the inventive arrangements, an unstructured least squares estimate can be produced for a MIMO time-invariant flat Rayleigh-fading channel. Additionally, a marginal probability density function can be computed for the unstructured least squares estimate. Based upon the marginal probability density function, the variance can be computed for the channel. Finally, both the unstructured least squares estimate and the variance collectively can be used to provide a Viterbi convolutional decoder the required soft-information.

BRIEF DESCRIPTION OF THE DRAWINGS

There are, shown in the drawings, embodiments which are presently preferred; it is understood, however, that the invention is not limited to the precise arrangements and instrumentalities shown, wherein.

DETAILED DESCRIPTION OF THE PREFERRED EMBODIMENTS

The present invention is a system and method for enhancing the data rate of a WLAN. Specifically, in the present invention, two or more crossed dipole antennas can be disposed both at the transmit and receive ends of the MIMO system. A MIMO transmission packet further can be provided which can include a MIMO preamble, SIGNAL field and OFDM DATA field in the same regard as a conventional SISO system transmission packet like the IEEE 802.11a transmission packet. Similarly, a carrier frequency offset estimation method, symbol timing method, and channel response method can be provided for the MIMO preamble. Finally, a MIMO soft-detector can be provided for bit-level detection.

Notably, the present invention can include a novel and non-obvious soft-detector for use in the MIMO system described herein. In the soft-detector of the present invention, unstructured least square estimates can be produced for received symbols in a MIMO system receiver. Additionally, signal-to-noise ratio can be computed for the received symbols. Subsequently, the produced unstructured least square estimates and the computed SNR are collectively used to provide soft-information to the decoder portion of the MIMO system receiver so that the decoder portion can decode the received signal while permitting only a minimum bit error rate.

Importantly, the decoder portion can be a Vitirbi convolutional decoder configured for use with soft-information rather than hard-information produced by a hard detector such as an ICNA or SPD scheme. Consequently, in the MIMO system described herein, hard information produced by a hard-detector will not be required.

Figure 1:
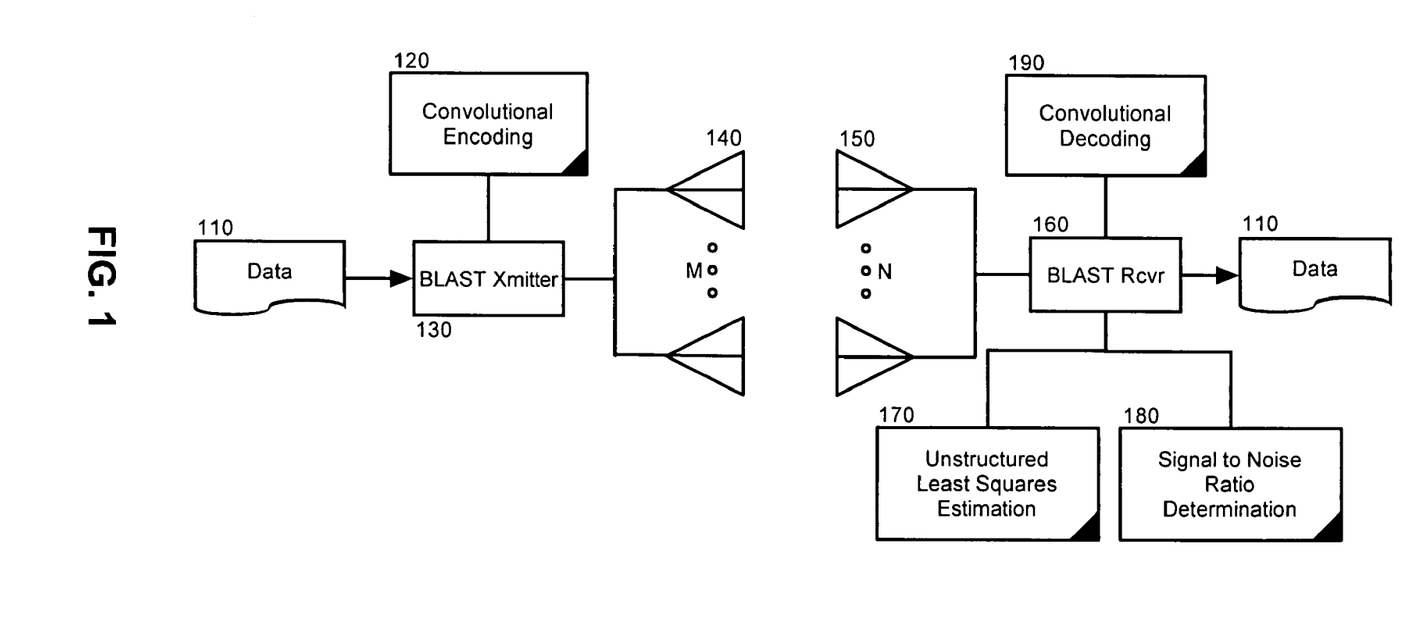
FIG. 1 is schematic illustration of a MIMO system configured with the soft-detector of the present invention.

FIG. 1 is schematic illustration of a MIMO system configured with the soft-detector of the present invention. In a preferred aspect of the invention, the MIMO system can include a BLAST transmitter 130 communicatively coupled to a BLAST receiver 160. The BLAST transmitter 130 can process data 110 through a convolutional encoder 120 to produce encoded data formatted for wireless transmission via an array of M antennae 140.

The wirelessly transmitted packets can be formatted for backward compatibility with conventional WLAN packet formatting protocols. Though the preamble design can be used with two transmission antennae 140 and an unlimited number of receiving antennae 150, two pairs of each antennae type can be suitable. In this regard, the packets can be transmitted simultaneously from the transmit antennae 140, each packet having a SISO-like preamble. Referring to FIG. 5 for a moment, for an IEEE 802.11a based SISO system, as an example, short training symbols can be used to detect the arrival of the packet, to allow the automatic gain control to stabilize, to compute a coarse CFO estimate, and to obtain a coarse symbol timing. Long training symbols, by comparison, can be used to calculate a fine CFO estimate, refine the coarse symbol timing, and estimate the SISO channel.

Figure 6:
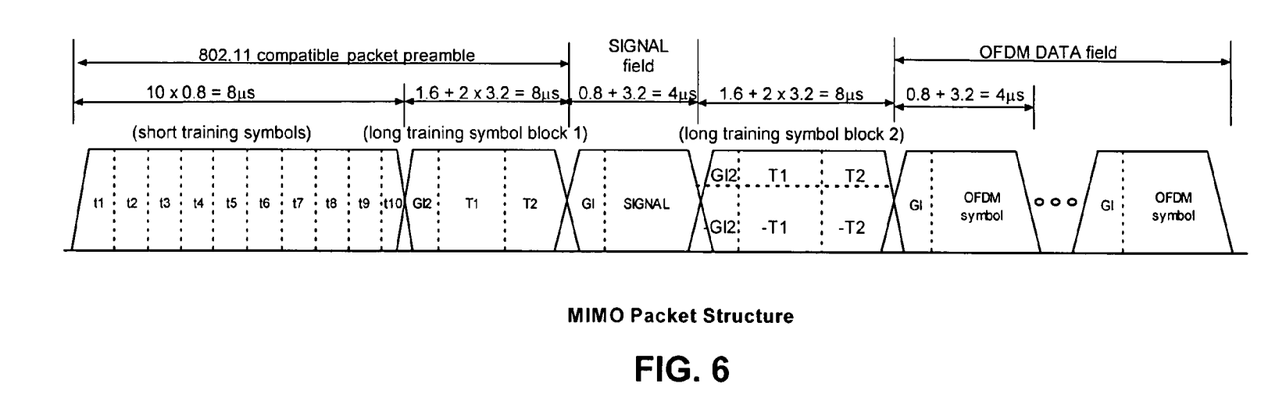

FIG. 6 is a timing diagram illustrating a MIMO packet structure for use in the MIMO system of the present invention. By comparison to the packet structure of FIG. 5, initially it can be presumed that the receiver antennae outputs of the MIMO system suffer from the same CFO and have the same symbol timing. Thus, as shown in FIG. 6, to ensure backward compatibility with a conventional SISO arrangement, identical short training symbols can be used in the MIMO system of the present invention as in the SISO preamble for the transmit antennae of the MIMO system. In respect to channel estimation, an orthogonal training sequence can be further incorporated in the preamble design of the MIMO system of the present invention.

In the interest of backward compatibility, both T1 and T2 can remain the same as in the case of the conventional SISO system, (as well as GI2) for both of the MIMO system transmit antennae before the SIGNAL field, as shown in FIG. 6. After the SIGNAL field, however, an additional T1, T2 and GI2 can be provided for a first transmit antenna, while a −T1, −T2 and −GI2 can be provided for the other transmit antenna. In this way, when simultaneously transmitted packets received by a single SISO receiver, the SISO receiver can successfully detect up to the SIGNAL field, which remains the same for both transmit antennae. Using the reserved bit within the SIGNAL field, the SISO receiver can stop its operation whenever a MIMO transmission follows. Otherwise, the SISO receiver can continue its operation.

The long training symbols shown in FIG. 6 as both before and after the SIGNAL field can be re-used in MIMO receivers for channel estimation. Once again, an inspection of the reserved bit in the SIGNAL field can inform the MIMO receiver that the transmission is a SISO transmission. Upon detecting a SISO transmission, the MIMO receiver can modify its channel estimation and data bit detection steps to accommodate the SISO type transmission.

Importantly, one skilled in the art will recognize that many other MIMO preamble designs can ensure backward compatibility with conventional SISO systems and the foregoing description of a specific MIMO packet structure is not to be taken as the exclusive manner in which a MIMO packet can be configured for backward compatibility. For example, by exploiting the transmit/receive diversities, one can attain improved symbol timing or CFO correction. However, these improvements do not necessarily result in improved packet error rate (PER). Hence, at least in a preferred embodiment, the straightforward MIMO preamble design of FIG. 6 can suffice.

To stay as close to the IEEE 802.11a standard as possible, each of a scrambler, convolutional encoder, puncturer, FD (frequency domain) interleaver, symbol mapper, pilot sequence, and CP (cyclic prefix) can be included in the MIMO system in the same way as specified in a conventional SISO system such as IEEE 802.11a. To improve diversity, a simple spatial interleaver can be added to scatter every two consecutive bits across the two transmit antennas. In particular, the spatial interleaving can be performed before the FD interleaving.

Mathematically, then, consider the $n_s$ th subcarrier (for notational convenience, we drop the notational dependence on $n_s$ below). Consider the case of N receive antennas. (Note that considering the general case of N receive antennas does not add extra difficulties for the discussions below.) Let H denote the MIMO channel matrix for the $n_s$ th subcarrier:

$$H = \begin{bmatrix} h_{1,1} & h_{1,2} \\ h_{2,1} & h_{2,2} \\ \vdots & \vdots \\ h_{N,1} & h_{N,2} \end{bmatrix} \in C^{N \times 2}$$

where $h_{n,m}$ denotes the channel gain from the mth transmit antenna to the nth receive antenna for the $n_s$ th subcarrier. Let y denote a received data vector for the $n_s$ th subcarrier, which can be written as $y=Hx+e \in C^{N \times 1}$ where $x=[x_1 x_2]^T$ is the 2×1 QAM symbol vector sent on the $n_s$ th subcarrier and $e \approx N(0, \sigma^2 I_N)$ is the additive white circularly symmetric complex Gaussian noise with variance or $\sigma^2$.

Notably, applying the MIMO preamble packet structure of FIG. 6, sequential CFO, symbol timing, and MIMO channel estimation can be undertaken as follows. Specifically, the channel estimates can be obtained in the foregoing order.

Let $z_n(l)=z_n^{ne}(l)+e_n(l)$, n=1, . . . , N denote the lth time sample of the signal received from the nth receive antenna, starting from the moment that the receiver AGC has become stationary (the receiver AGC is assumed to become stationary at least before receiving the last two short OFDM training symbols and remain stationary while receiving the remainder of the packet).

In the presence of CFO, $\epsilon$, we have $z_n^{ne}(l+N_C)=z_n^{ne}(l) e^{j2N_C \pi \epsilon}$, n=1, . . . , N. For each receive antenna output, consider the correlation between two consecutive noise-free received data blocks, each of which is of length $N_C$. Then the sum of the correlations for all receive antennas can be written as $$\sum_{n=1}^{N} \sum_{l=k}^{k+N_C-1} z_n^{ne}(l)(z_n^{ne}(l+N_C))^* = e^{-j2N_C \pi \epsilon} \sum_{n=1}^{N} \sum_{l=0}^{N_C-1} |z_n^{ne}(l)|^2 \equiv P e^{-j2N_C \pi \epsilon}$$

where (.)* denotes the complex conjugate and k is any non-negative integer such that $z_n^{ne}(k+2N_C-1)$ is a sample of the nth receive antenna output due to the input (transmit antenna output) being a sample of the short OFDM training symbols of the MIMO packet preamble. Let $$\sum_{n=1}^{N} \sum_{l=0}^{N_C-1} z_n(l) z_n^*(l+N_C) = P e^{-j2N_C \pi \epsilon} + e_P$$

where $e_P$ is due to the presence of the noise. Based upon the foregoing, the coarse CFO can be computed according to $$\hat{\epsilon}_C = -\frac{1}{2N_C \pi} \angle P_S$$

where $\angle x$ denotes taking the argument of x.

The course CFO can be corrected using the computed $\hat{\epsilon}_C$ to obtain data samples $z_n^{(C)}(l)$, n=1,2, . . . , N, using the equation $z_n^{(C)}(l)=z_n(l)e^{j2l\pi \hat{\epsilon}_C}$. Correspondingly, the following will be recognized by the skilled artisan: $P_S^{(C)}=P_S e^{j2l\pi \hat{\epsilon}_C}$. Notably, in the sequel, only the CFO corrected data given above need to be considered. Moreover, for notational convenience the superscript of $z_n^{(C)}(l)$, n=1,2, . . . , N can be dropped.

As it will be recognized by the skilled artisan, symbol timing has been defined as the starting time sample due to the input being the long OFDM training symbol T1 (before the SIGNAL field). Once the starting time sample due to the long OFDM training symbol T1 is determined, the starting time sample due to every OFDM symbol thereafter can be determined, as it is specified in conventional WLAN specifications such as the IEEE 802.11a standard. In any case, the coarse symbol timing can be computed in iterative fashion according to:

$$P_R(k+1) = P_R(k) +$$
$$\text{Re}\left\{ \sum_{n=1}^{N} [z_n(k+N_C) z_n^*(k+2N_C) - z_n(k) z_n^*(k+N_C)] \right\}$$
$$= P_R(k) +$$
$$\sum_{n=1}^{N} \{\tilde{z}_n(k+N_C)[\tilde{z}_n(k+2N_C) - \tilde{z}_n(k)] +$$
$$\tilde{\tilde{z}}_n(k+N_C)[\tilde{\tilde{z}}_n(k+2N_C) - \tilde{\tilde{z}}_n(k)]\}$$

where both Re(●) and (●) denote the real portion of a complex entity and (●̃) reflects the imaginary portion. From the foregoing computations, the skilled artisan will recognize that the correlation after the CFO correction can be approximated as the real-valued scalar P in addition to a complex-valued noise. In this iterative approach, the iteration can begin using $P_R(0)=\text{Re}(P_S)$. It will be noted that, when compared to conventional correlative techniques, the real-valued correlation approach stated above incorporates fewer computations, lowers the noise level (variance reduced in half) in the correlation sequence, and decreases closer to zero as the data samples in the sliding data blocks are due to the input being GI2 or the long OFDM training symbols following the short OFDM training symbols in the MIMO preamble.

When some of the data samples of the sliding data blocks are taken from the received data due to the input being GI2 or the long training symbols following the short OFDM training symbol, $P_R(k)$ will drop. This dropping property can be used to obtain the coarse symbol timing.

Let $T_P$ denote the first time sample when $P_R(k)$ drops to below half of its peak value. The coarse symbol timing can be expressed as $$T_C = T_P + \frac{3}{2}N_C + N_C,$$

where $T_C$ is the coarse estimate of the beginning time sample due to the input being the long OFDM training symbol T1 before the SIGNAL field. The second term at the right hand side of the above equation is due to the fact that $P_R(k)$ will drop to approximately one half of its maximum value when the data samples of the second half of the second of the two sliding blocks are due to the first GI2 in the MIMO preamble as input GI2; the third term is due to one half of the length of GI2. When the channel spreading delay $t_D = \max\{\tau_p - \tau_1\}$ is assumed to satisfy $t_D \leq N_C$, only the first half of GI2 can suffer from inter-symbol interference. Hence it is preferred to place the coarse timing estimate between the true timing $T_0 = 193$ and $T_0 - N_C = 177$ to produce as accurate a fine CFO estimation as possible.

For each receive antenna output, a correlation between the two long training symbols before the SIGNAL field can be computed. The correlations subsequently can be summed for all receiving antennas as follows:

$$P_L = \sum_{n=1}^{N} \sum_{l=0}^{N_S-1} z_n(l+T_C) z_n^*(l+T_C+N_S)$$

Consequently, the fine CFO estimate can be computed as $$\hat{\varepsilon}_F = -\frac{1}{2N_S\pi} \angle P_L.$$

It will be recognized by the skilled artisan that the fine CFO estimate can be used in the same manner as the course CFO estimate to correct the CFO. It can be important to note that the fine CFO estimation is accurate enough for the following fine symbol timing estimation and MIMO channel response estimation. Yet, the fine CFO estimation can never be perfect due to the presence of noise. Hence before data bits detection, it is preferable to use the pilot symbols to track the CFO residual phase for each OFDM data symbol.

Once the CFO has been corrected with the fine CFO estimate, the fine symbol timing can be obtained through the use of N data blocks of length $N_S$ corresponding to the N receive antennas, starting from the time sample $T_C$. In this regard, let $y_n$ denote the $N_S$-point FFT of the data block from the nth receive antenna. Furthermore, let $h_{n,m}^{(t)}$ be the equivalent FIR channel in the time-domain between the mth transmit antenna and the nth receive antenna, n=1, 2, ..., N, and m=1, 2. Then, by neglecting the existence of the residual CFO, $y_n$ can be written as $$y_n = S_B W_{N_S} \sum_{m=1}^{2} h_{n,m}^{(t)} + W_{N_S} e_n$$

where $S_B$ is a diagonal matrix with the fifty-two known BPSK symbols which form T1 of FIG. 6, and twelve zeros on the diagonal. Since the Moore-Penrose pseudo-inverse of $S_B$ is $S_B$ itself and $W_{N_S}/N_S^{1/2}$ is unitary, an estimate of $\hat{h}_n^{(t)} = \sum_{m=1}^{2} h_{n,m}^{(t)}$ can be produced as $$\hat{h}_n^{(t)} = \frac{1}{N_S} W_{N_S}^H S_B y_n.$$

Let $T_1$ denote the index of the first element of $\sum_{n=1}^{N} |\hat{h}_n^{(t)}|$ that is above one-third of the maximum value of the elements of $\sum_{n=1}^{N} |\hat{h}_n^{(t)}|$. Then, the fine symbol timing $T_F$ can be defined as $T_F = T_C + T_1 - 3$. Importantly, the constant 3 can be chosen to ensure that $T_F > T_0$.

After $T_F$ has been obtained, the MIMO channel response can be estimated. Specifically, $y_{n,1}$ can be allowed to denote the $N_S$-point FFT of the average of the two consecutive blocks, each of which is of length $N_S$, associated with the two long training symbols before the SIGNAL field, from the nth receive antenna. Correspondingly, $y_{n,2}$ can be allowed to denote the counterpart of $y_{n,1}$ after the SIGNAL field. Thus, for the $n_S$ th sub-carrier, the following can hold true:

$$y_{n,1} \approx s_B(h_{n,1} + h_{n,2}),$$

$$t_{n,2} \approx s_B(h_{n,1} - h_{n,2})$$

where $s_B$ denotes the $n_s$ th diagonal element of $S_B$, $y_{n,i}$ denotes the $n_s$ th element of $y_{n,1}$, i=1 and wherein the dependence upon $n_S$ has been dropped for notational simplicity. Solving for both equations can yield the channel estimates:

$$\hat{h}_{n,1} = s_B(y_{n,1} + y_{n,2})/2,$$

$$\hat{h}_{n,2} = s_B(y_{n,1} - y_{n,2})/2$$

When the reserved bit in the SIGNAL field indicates a SISO transmission, however, only $h_{n,1}$, n=1,2, ..., N need be solved.

Returning now to FIG. 1, with the channel parameters such as CFO, symbol timing, and MIMO channel determined and corrected, the data bits contained in each layer in the OFDM DATA field can be detected. To that end, the received packets can be subjected to a convolutional decoding process 190 to produce the data 110 with a minimum bit error rate. Significantly, the convolutional decoding process 190 can receive soft-information in order to improve the decoding performance. More specifically, an unstructured least squares estimation process 170 can compute a set of unstructured least squares estimates based upon the channel gain between each of the transmitting antennae 140 and the receiving antennae 150.

In addition, a SNR determination process 180 can produce the SNR on each subcarrier. The combined output of the unstructured least squares estimation process 170 and the SNR determination process 180 can be collectively used to obtain the "soft-information" necessary for the effective operation of the convolutional decoding process 190.

Figure 2:
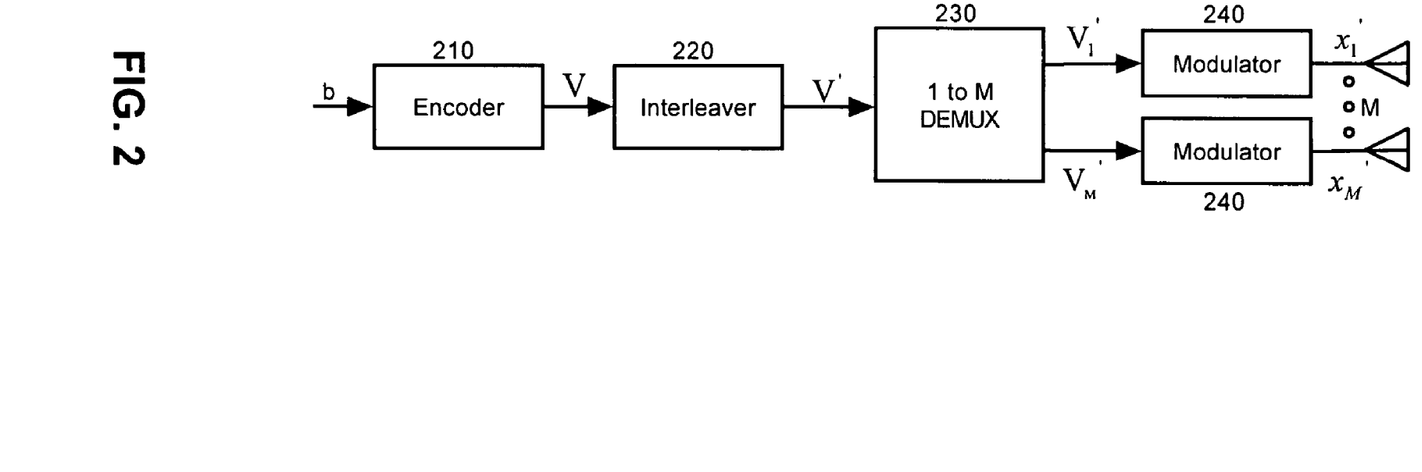
FIG. 2 is a schematic illustration of a MIMO transmitter for use in the MIMO system of FIG. 1.

FIG. 2 is a schematic illustration of a MIMO transmitter for use in the MIMO system of FIG. 1. The MIMO transmitter can include a convolutional encoder 210, a bit interleaver 220, a 1 to M Demultiplexer 230, and M Modulators 240 coupled to corresponding antennae. Initially, the convolutional encoder 210 can receive a block of size L bits, $b=\{b_1, b_2, \ldots, b_L\} \in \{0,1\}^{1 \times L}$ as its input and can produce a larger block of bits of size $\check{L}$ representing the coded signal:

$$C(b) = \{u_1, u_2, \ldots, u_{\check{L}}\} \in \{0,1\}^{1 \times \check{L}}.$$

Based upon the coding of the signal C(b), the coding rate can be defined as $$R_C = \frac{L}{\check{L}}.$$

Still, as it will be recognized by one skilled in the art, it can be preferable to puncture the output block u to obtain a smaller block of bits of size $\tilde{L}$ $$v = \{v_1, v_2, \ldots, v_{\tilde{L}}\} \in \{0,1\}^{1 \times \tilde{L}} (\tilde{L} < \check{L})$$

to increase the data rate. Accordingly, the puncturing rate can be expressed as:

$$R_P = \frac{\tilde{L}}{\check{L}}.$$

Hence the coding rate of the punctured output can be expressed as:

$$R_P = \frac{R_C}{R_P}.$$

Once punctured, the output v of the convolutional coder 210 can be forwarded to the interleaver 220. The interleaver can produce the output $$v' = \{v'^{(1)}, v'^{(2)}, \ldots, v'^{(L)}\} \in \{0,1\}^{1 \times \tilde{L}}$$

which can be subsequently fed to the 1 to Mdemultiplexer 230. Notably, as $$L' = \frac{\tilde{L}}{M} = KN_{CBPS}$$

is an integer, and the output of the 1 to M demultiplexer 230 can include M independent layers. Here K is an integer and NCBPS is the number of coded bits per data OFDM symbol. Each layer can be denoted as a block of bits of size L':

$$v'_m = \{v_m^{(1)}, v_m^{(2)}, \ldots, v_m^{(L')}\} \in \{0,1\}^{1 \times L'}, m=1,2,\ldots,M$$

Each modulator 240 can map each layer of the binary bits into data OFDM symbols in the same way as a conventional SISO OFDM modulator.

Figure 3:
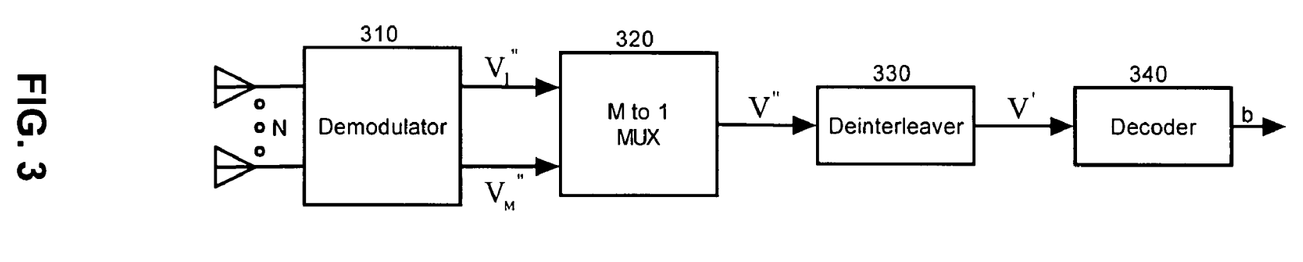
FIG. 3 is a schematic illustration of a MIMO receiver for use in the MIMO system of FIG. 1.

FIG. 3 is a schematic illustration of a MIMO receiver for use in the MIMO system of FIG. 1. The MIMO receiver (i.e., the BLAST receiver 160) can include a demodulator 310 coupled to N antennae, an M to 1 multiplexer 320, a deinterleaver 330 and a convolutional decoder 340 or 190. Consider the nth subcarrier for the kth, k=1, ..., K, data OFOM symbol. (For national convenience, we drop the dependence on $n_S$ and k.) The demodulator 310 (i.e., the unstructured least-squares detector 170) initially can generate a soft-decision statistic $\hat{x}_m$ for each transmitted QAM symbol $x_m$, m=1,2, ..., M. The statistic can be expressed as $\hat{x}_m = x_m + e_m$ where $e_m$ is assumed to be a circularly symmetric independently distributed complex Gaussian error with zero-mean and variance $(\sigma_m)^2$. Notably, the assumption set forth herein can be ensured through the interleaving. In any case, the pair of equations, $(\hat{x}_m, \sigma_m)$ can be used to obtain "soft information" associated with the received data of the transmitted QAM symbol $x_m$.

Significantly, the demodulator 310 can map the soft-information to obtain the bit metric: $\{\hat{v}_m^{(1)}, \hat{v}_m^{(2)}, \ldots, \hat{v}_m^{(B)}\}$ for the binary bits x mapped to the QAM symbol $x_m$. More particularly, as the real and imaginary portions of the QAM symbol are orthogonal to each other and the real and imaginary portions of the additive complex Gaussian noise are shown to be independent of each other, the soft-decision statistic can be mathematically divided into real and imaginary parts corresponding to the soft-decision statistic of two real valued pulse amplitude modulated (PAM) symbols. The variance of the noise additive to the PAM symbols can be halved as compared to the QAM symbols. Consequently, the bit metric can be calculated for each symbol in a PAM constellation.

In this regard, where $D_{ij} = \{s: s \in \Re\}$ denotes the set of all possible PAM symbols for the PAM constellation $\Re$, with the i th bit $v_i = j, i=1,2, \ldots, B/2, j=0,1$, the formation of $D_{i,j}$ can depend upon the manner in which the PAM symbols are labeled. In any case, for a given set of soft-information $(x, \sigma)$ for the PAM symbol, the bit metric for $v_i$ can be given by:

$$\hat{v}_i = \log \frac{p_\sigma(v_i = 1 \mid x)}{p_\sigma(v_i = 0 \mid x)}, \text{ where}$$

$$p_\sigma(v_i = j \mid x) = p_\sigma(D_{i,j} \mid x) = \sum_{s \in D_{i,j}} p_\sigma(s \mid x) = \sum_{s \in D_{i,j}} \frac{f_\sigma(x \mid s) p(s)}{p(x)}$$

with $$f_\sigma(x \mid s) = \frac{1}{\sqrt{2\pi} \, \sigma} e^{-\frac{(x-2)^2}{2\sigma^2}}$$

as the probability density function given the symbol x and the variance $\sigma^2$.

The occurrence of each symbol in $\Re$ can be assumed to be equally as likely which can be expressed mathematically as $p(s) = (\frac{1}{2})^{B/2}, \forall s \in \Re$. Consequently, $p_\sigma(v_i = j \mid x)$ can be expressed as $$\frac{1}{2^{B/2} p(x)} \sum_{s \in D_{i,j}} f_\sigma(x \mid s)$$

which can lead to the identity:

$$\hat{v}_i = \log\left\{\sum_{s\in D_{i,1}} e^{\frac{(x-s)^2}{2\sigma^2}}\right\} - \log\left\{\sum_{s\in D_{i,0}} e^{\frac{(x-s)^2}{2\sigma^2}}\right\}.$$

Notably, to enhance the speed of computing the bit metric, practically a grid can be pre-computed for varying sets of x and σ. The grid can be arranged in tabular format as a look-up table for selected $v_i$s.

Returning now to FIG. 3, presuming that the output of the demodulator 310 can be expressed as $v''_m = \{\hat{v}_m^{(1)}, \hat{v}_m^{(2)}, \ldots, \hat{v}_m^{(L')}\}$, m=1,2, . . . , M for the bit metric sequence corresponding to the Mth transmitted layer, the M bit metric sequences can be combined by the M to 1 Multiplexer 320 to produce the longer bit metric sequence $v''=\{\hat{v}^{(1)}, \hat{v}^{(2)}, \ldots, \hat{v}^{(L')}\}$. Passing v" through the deinterleaver 330, a deinterleaved bit metric sequence can be produced according to the equation $v'=\{\hat{v}_1, \hat{v}_2, \ldots, \hat{v}_{\tilde{L}}\}$. Subsequently, a zero bit metric can be applied to each punctured bit prior to applying the Viterbi decoding algorithm to the bit sequence. The application of the zero bit metric can produce the bit sequence $\hat{u} = \{\hat{u}_1, \hat{u}_2, \ldots, \hat{u}_{\tilde{L}}\}$ corresponding to the encoder output u. Subsequently, applying the Viterbi decoding algorithm to the sequence u, an estimated bit sequence can be produced for the original source binary bit sequence, b.

Figure 4:
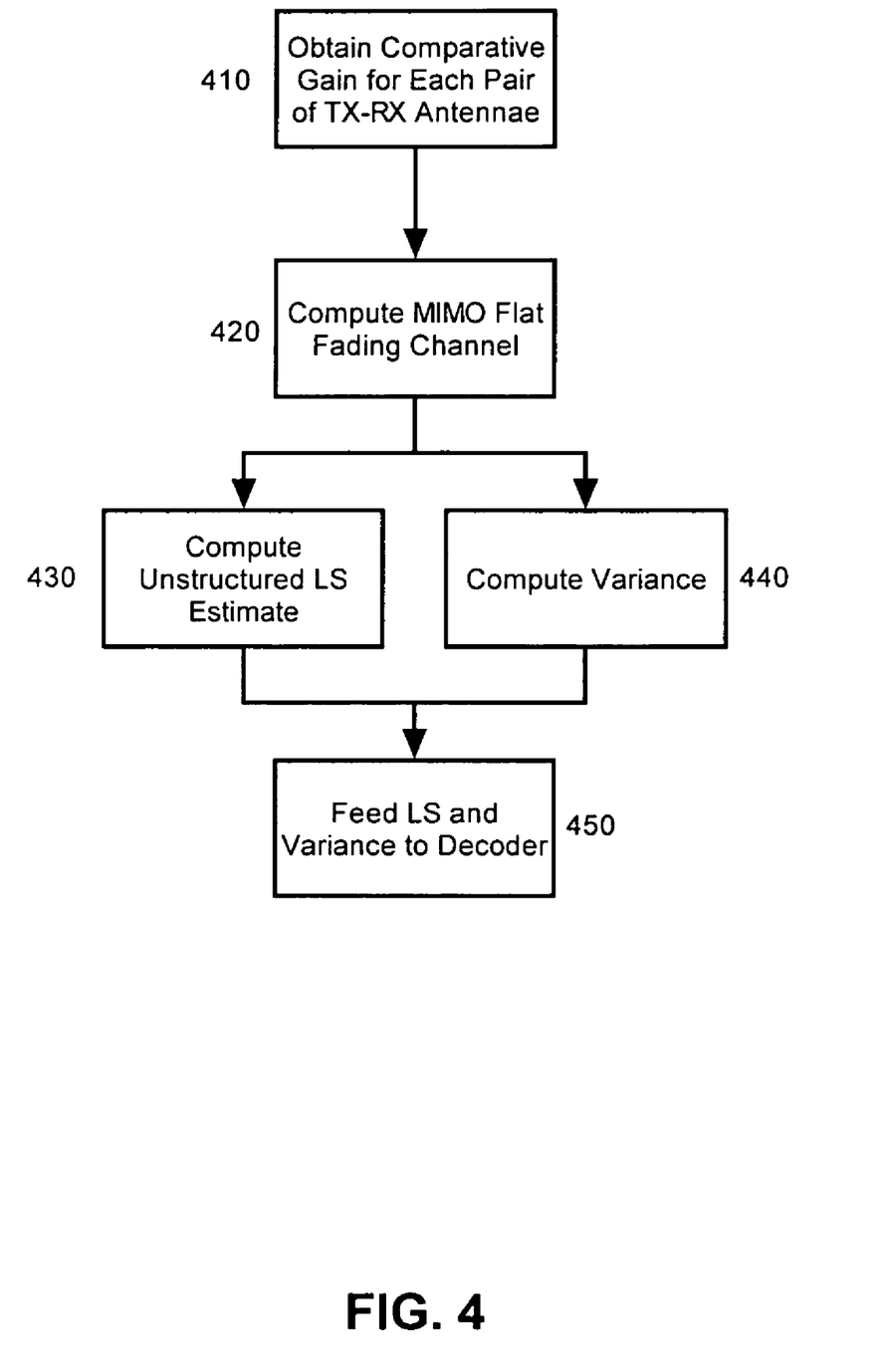
FIG. 4 is a flow chart illustrating a process for acquiring and computing soft information for use in the decoder of FIG. 3.

FIG. 4 is a flow chart illustrating a process for acquiring and computing soft information for use in the decoder of FIG. 3. The process can begin in block 410 in which the comparative gain for each subcarrier can be obtained for each pair of M transmit and N receive antennae in the MIMO system. In block 420, the comparative gains can be written in matrix form to obtain $$H = \begin{bmatrix} h_{1,1} & h_{1,2} & \cdots & h_{1,M} \\ h_{2,1} & h_{2,2} & \cdots & h_{2,M} \\ \vdots & \vdots & \ddots & \vdots \\ h_{N,1} & h_{N,2} & \cdots & h_{N,M} \end{bmatrix} \in C^{N \times M}$$

where $h_{n,m}$ is the gain from the mth transmit antenna to the nth receive antenna on the $n_s$th subcarrier. (We drop $n_s$ for convenience.) With $x=[x_1\ x_2\ \ldots\ x_M]^T$ denoting the M×1 QAM symbol vector transmitted at the time Ĩ, the received signal can be expressed as $y = Hx + n \in C^{N\times 1}$ where $n \approx N(0,\sigma_i^2 I_N)$ can represent the additive white circularly symmetric complex Gaussian noise.

Subsequently, in block 430, the unstructured least squared estimate can be established as $\hat{x}_{us} = x + (H^H H)^{-1} H^H n = x + e$. By ignoring the dependence among the elements of e, we can consider only the marginal probability density function for the unstructured least squares estimate $\hat{x}_{us}(m)$, m=1,2, . . . , M $$(H^H H)^{-1} H^H = \begin{bmatrix} \tilde{h}_1^T \\ \tilde{h}_2^T \\ \vdots \\ \tilde{h}_M^T \end{bmatrix} \in C^{M \times N}$$

Then the mth element of e, $e_m$, with m ranging from 1 to M, can be expressed as $e_m = \tilde{h}_m^T n$. As such, in block 440 the variance can be computed as $\sigma_m^2 = E[|e_m|^2] = \|\tilde{h}_m\|^2 \sigma^2$. Finally, in block 450 the variance along with the unstructured least squares estimate can be provided to the decoder as the required soft information.

The method of the present invention can be realized in hardware, software, or a combination of hardware and software. An implementation of the method of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method of wirelessly conveying data comprising the steps of:
    digitally encoding said data into a plurality of data packets using at least one encoder, each data packet having a MIMO preamble;
    simultaneously transmitting said packets using a plurality of transmission antennas;
    based upon said MIMO preamble, sequentially estimating a carrier frequency offset (CFO), symbol timing, and channel response, wherein the estimated CFO refines a coarse CFO, and the estimated symbol timing refines a course symbol timing; and
    based upon said transmitted packets, generating said data at a receiving location.

2. The method of claim 1, said digital encoding step using a channel coding technique to implement forward error correction.

3. The method of claim 2, wherein said channel coding technique is a convolutional encoding technique.

4. The method of claim 1, wherein said transmitting step further comprises the step of:
    introducing temporal and spatial correlation into signals transmitted from different ones of said plurality of transmission antennas using a spacetime coding technique.

5. The method of claim 1, wherein said transmitting step further comprises the step of:
    scattering data bits of selective ones of said packets across a plurality of said antennas using a spatial interleaving technique.

6. The method of claim 1, said generating step further comprising the steps of:
  receiving said packets using a plurality of receiving antennas; and
  digitally decoding said packets using a soft decoder.

7. The method of claim 6, wherein said decoding step utilizes an unstructured least squares estimation technique.

8. The method of claim 6, wherein said decoding step further comprises the step of:
  computing a signal to noise ratio of received signals that is used during said decoding process.

9. The method of claim 1, wherein the step of encoding comprises encoding each data packet so that the MIMO preamble is backwardly compatible with a SISO system.

10. The method of claim 1, the step of digitally encoding comprises encoding each data packet so that the MIMO preamble comprises first and second long training sequences separated by a signal field, the second long training symbol block comprising a first training sequence associated with a first antenna and a second training sequence associated with a second antenna, the first and second training sequences being orthogonal with respect to one another.

11. A method of wirelessly conveying data comprising the steps of:
  digitally encoding said data into a plurality of data packets using at least one encoder, each data packet having a MIMO preamble;
  simultaneously transmitting said packets using a plurality of transmission antennas;
  generating soft-information for improving the performance of a convolutional decoding process, the soft-information comprising (a) a set of unstructured least squares estimates based upon channel gain between a plurality of transmitting antennas and a plurality of receiving antennas and (b) a variance of error terms, the error terms corresponding to noise generated in a MIMO channel; and
  based upon said transmitted packets, generating said data at a receiving location.

12. The method of claim 11, said digital encoding step using a channel coding technique to implement forward error correction.

13. The method of claim 12, wherein said channel coding technique is a convolutional encoding technique.

14. The method of claim 11, wherein said transmitting step further comprises the step of:
  introducing temporal and spatial correlation into signals transmitted from different ones of said plurality of transmission antennas using a space-time coding technique.

15. The method of claim 11, wherein said transmitting step further comprises the step of:
  scattering data bits of selective ones of said packets across a plurality of said antennas using a spatial interleaving technique.

16. The method of claim 11, said generating step further comprising the steps of:
  receiving said packets using a plurality of receiving antennas; and digitally decoding said packets using a soft decoder.

17. The method of claim 16, wherein said decoding step utilizes an unstructured least squares estimation technique.

18. A machine readable storage having stored thereon a computer program for soft-detecting soft-information required by a convolutional decoder in a wireless multi-input multi-output (MIMO) system, said computer program comprising a set of instructions executable within a computing machine which when executed cause the machine to perform the steps of:
  producing an unstructured least squares estimate for a time-varying channel in the MIMO system, said unstructured least square estimate being based upon channel gains between a plurality of transmitting antennae and receiving antennae of the MIMO system;
  computing a SNR based on said produced unstructured least squares estimate; and
  providing to the convolutional decoder as the soft-information said unstructured least squares estimate and a variance of error terms, each of the error terms based upon the channel gains and noise generated in a MIMO channel.

19. A system for wireless conveying digital information comprising:
  a transmitting source having a plurality of transmitting antennas, wherein data is transmitted from said plurality of transmitting antennas simultaneously;
  a channel encoder communicatively linked to said transmitting source, said channel encoder configured to encode electronic documents into a plurality of packets, each packet having a MIMO preamble;
  a receiving mechanism having a plurality of receiving antennas; and
  a soft decoder communicatively linked to said receiving mechanism for receiving a soft information comprising a set of unstructured least squares estimates and a variance of error terms based upon MIMO channel noise.

20. The system of claim 19, wherein said transmitting source introduces temporal and spatial correlation into signals transmitted from different ones of said plurality of transmission antennas using a space-time coding technique.

21. The system of claim 19, wherein said channel encoder utilizes a channel coding technique to implement forward error correction.

22. The system of claim 21, wherein said channel coding technique is a convolutional encoding technique.

23. The system of claim 19, wherein said soft decoder calculates a plurality of unstructured least squares estimates when decoding received signals.

24. The system of claim 19, wherein said soft decoder calculates a signal to noise ratio of received signals when decoding said received signals.

25. The system of claim 19, further comprising:
  an interleaver communicatively linked to said transmitting source; and
  a deinterleaver communicatively linked to said receiving mechanism.

26. A method of wirelessly conveying data comprising the steps of:
  digitally encoding the data into a plurality of data packets using at least one encoder, each data packet having a MIMO preamble that includes a first training symbol block and a second training symbol block, wherein the second training symbol block comprises a first training sequence associated with a first antenna and a second training sequence associated with a second antenna;
  simultaneously transmitting said packets using a plurality of transmission antennas; and
  based upon the MIMO preamble, performing at least one of estimating a carrier frequency offset, determining a symbol timing, and generating a MIMO channel estimate.

27. The method of claim 26, wherein the step of digitally encoding comprises encoding each data packet so that the first and second training sequences are orthogonal to one another.

28. A method of wirelessly conveying data, the method comprising:
   estimating comparative gain for each of a plurality of pairs of transmitting and receiving antennas;
   generating a MIMO fat-fading channel representation;
   computing a plurality of unstructured least squares estimates and variance of error terms based on MIMO channel noise; and
   supplying the unstructured least squares estimates and variance to a decoder for performing a convolutional decoding process based upon the supplying unstructured least squares estimates and variance.

* * * * *